US012252668B2

(12) United States Patent
Doering et al.

(10) Patent No.: US 12,252,668 B2
(45) Date of Patent: Mar. 18, 2025

(54) CLEANING AGENT HAVING CLEAR RINSER FOR AUTOMATIC DOSING UNIT

(71) Applicant: Henkel AG & Co. KGaA, Duesseldorf (DE)

(72) Inventors: Thomas Doering, Dormagen (DE); Thorsten Bastigkeit, Wuppertal (DE); Carola Ulbrich, Leichlingen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 745 days.

(21) Appl. No.: 17/329,133

(22) Filed: May 24, 2021

(65) Prior Publication Data

US 2021/0277339 A1 Sep. 9, 2021

Related U.S. Application Data

(63) Continuation of application No. PCT/EP2019/081767, filed on Nov. 19, 2019.

(51) Int. Cl.

| | |
|---|---|
| ***C11D 1/66*** | (2006.01) |
| ***C11D 1/00*** | (2006.01) |
| ***C11D 3/00*** | (2006.01) |
| ***C11D 3/04*** | (2006.01) |
| ***C11D 3/08*** | (2006.01) |
| ***C11D 3/10*** | (2006.01) |
| ***C11D 3/20*** | (2006.01) |
| ***C11D 3/33*** | (2006.01) |
| ***C11D 3/34*** | (2006.01) |
| ***C11D 3/386*** | (2006.01) |
| ***C11D 3/43*** | (2006.01) |
| ***C11D 17/04*** | (2006.01) |

(52) U.S. Cl.

CPC .............. *C11D 17/046* (2013.01); *C11D 1/00* (2013.01); *C11D 1/66* (2013.01); *C11D 3/0073* (2013.01); *C11D 3/046* (2013.01); *C11D 3/08* (2013.01); *C11D 3/10* (2013.01); *C11D 3/2065* (2013.01); *C11D 3/2075* (2013.01); *C11D 3/2079* (2013.01); *C11D 3/2082* (2013.01); *C11D 3/33* (2013.01); *C11D 3/3409* (2013.01); *C11D 3/3418* (2013.01); *C11D 3/386* (2013.01); *C11D 3/38618* (2013.01); *C11D 3/43* (2013.01); *C11D 17/045* (2013.01); *C11D 2111/18* (2024.01)

(58) Field of Classification Search

CPC .. C11D 1/00; C11D 1/66; C11D 3/046; C11D 3/08; C11D 3/10; C11D 3/2065; C11D 3/2082; C11D 3/2075; C11D 3/386; C11D 3/3409; C11D 17/045; C11D 17/046

USPC ....... 510/221, 223, 226, 227, 229, 230, 393, 510/477, 488, 499, 509

See application file for complete search history.

(56) References Cited

U.S. PATENT DOCUMENTS

| | | | | |
|---|---|---|---|---|
| 2009/0239778 | A1* | 9/2009 | Gentschev | C11D 3/38618 510/223 |
| 2010/0125046 | A1* | 5/2010 | Denome | C11D 17/045 510/277 |
| 2013/0146101 | A1 | 6/2013 | Gentschev et al. | |
| 2013/0274167 | A1* | 10/2013 | Gutowski | C11D 3/10 510/218 |
| 2015/0080561 | A1* | 3/2015 | Torres | C09B 29/0802 534/766 |
| 2015/0267155 | A1* | 9/2015 | Brooker | C11D 17/043 8/137 |
| 2015/0267156 | A1* | 9/2015 | Brooker | D06F 21/00 8/137 |
| 2017/0191004 | A1 | 7/2017 | Schmaelzle et al. | |
| 2018/0195024 | A1* | 7/2018 | Piorkowski | C11D 3/001 |

FOREIGN PATENT DOCUMENTS

| | | | | | |
|---|---|---|---|---|---|
| DE | 102005062479 | A1 | | 7/2007 | |
| DE | 102011005980 | A1 | | 9/2012 | |
| EP | 1759624 | A2 | | 3/2007 | |
| EP | 3202878 | A1 | * | 8/2017 | B65B 9/042 |
| EP | 3363889 | A1 | * | 8/2018 | |
| GB | 2505734 | A | * | 3/2014 | C11D 17/0004 |
| WO | WO-2015034895 | A1 | * | 3/2015 | C11D 3/0036 |
| WO | WO-2016048973 | A1 | * | 3/2016 | C11D 1/00 |

OTHER PUBLICATIONS

PCT International Search Report PCT/EP2019/081767 Completion Date: Feb. 14, 2020; Mail Date: Feb. 20, 2020 2 pages.

* cited by examiner

*Primary Examiner* — Gregory R Delcotto

(74) *Attorney, Agent, or Firm* — Bojuan Deng

(57) ABSTRACT

A cleaning agent which contains, separately from one another in a packaging form, at least one enzyme-containing preparation and at least one builder-containing preparation, as well as a clear rinser preparation.

18 Claims, No Drawings

CLEANING AGENT HAVING CLEAR RINSER FOR AUTOMATIC DOSING UNIT

FIELD OF THE INVENTION

The invention relates to a cleaning agent which contains, separately from one another in a packaging means, at least one enzyme-containing preparation and at least one builder-containing preparation, as well as a clear rinser preparation.

BACKGROUND OF THE INVENTION

The forms in which cleaning agents are packaged and sold are subject to constant changes. For some time, special attention has been paid to the easy dosing of cleaning agents and the simplification of the operational steps required to carry out a cleaning process.

In particular devices for multiple dosing of cleaning agents are desired by consumers. In this case, a distinction may be made between devices in dosing compartments integrated into the dishwasher and devices which are independent of the dishwasher. Portions of cleaning agent are dosed, automatically or semi-automatically, into the interior of the cleaning machine over the course of several sequential cleaning processes by means of these devices, which contain many times the amount of cleaning agent needed to carry out a cleaning process. For the consumer, there is no need to dose the cleaning agent before the start of each individual cleaning cycle. Examples of such devices are described in European patent application EP 1 759 624 A2 (Reckitt Benckiser), or in German patent application DE 10 2005 062 479 A1 (BSH Bosch und Siemens Hausgeräte GmbH).

In particular, consumers having relatively low volumes of washing-up/laundry want a solution that is uncomplicated and easy to use.

Regardless of the exact design of the dosing devices used in the interior of dishwashers, the cleaning agents contained in these devices for multiple dosing are also exposed to in particular changing temperatures over a longer period of time, these temperatures being the first approximation of the water temperatures used to carry out the cleaning process. These temperatures can be up to 95° C., although usually only temperatures between 5° and 75° C. are reached in the field of automatic dishwashing. A cleaning agent contained in a device provided for multiple dosing is accordingly repeatedly heated in the course of several cleaning processes to temperatures well above the temperatures customary for transport and storage, with temperature-sensitive active substances being affected in particular.

In particular consumers who load the dishwasher with dishes over several days and the soiled items to be washed remain uncleaned inside the dishwasher for some time before a wash cycle is carried out have the problem that the cleaning performance of the products, particularly in the case of stubborn, in particular dried-on food residues on the items to be washed, for example porridge oats or tea, leaves much to be desired in comparison with prompt washing after the items have been used. However, rinsing off leftover food before sorting it into the dishwasher is not advantageous for ecological and time-related reasons and with regard to the additional water costs.

BRIEF SUMMARY OF THE INVENTION

The object of the present application was therefore to provide a cleaning agent product form which provides good cleaning performance, in particular on dried-on food residues, in particular minced meat, porridge oats and/or tea, even if there are several days between the individual usage cycles. In particular, this system should have little outlay for the consumer.

The present application therefore relates first to a cleaning agent product form, comprising

- a) a liquid (20° C.) cleaning agent preparation A, containing
  - a1) builder;
  - a2) complexing agents
- b) a liquid (20° C.) cleaning agent preparation B that is different from cleaning agent preparation A, having a water content above 1 wt. %, containing
  - b1) at least 5 wt. % of at least one cleaning-active enzyme preparation
- c) a liquid (20° C.) cleaning agent preparation C, containing
  - c1) an acidifying agent,
  - c2) a glass corrosion inhibitor,
  - c3) optionally a non-ionic surfactant,
  - c4) optionally a hydrotropic substance, and
  - c5) optionally less than 1 wt. %, preferably less than 0.5 wt. %, in particular less than 0.1 wt. %, enzyme preparation, and
- d) a packaging material in which cleaning agent preparations A, B and C are separate from one another.

The combination of such a composition with the cleaning agent preparations according to the invention has the advantage for the consumer that he does not have to worry too much about renewing or replacing the active ingredient composition and the cleaning agent preparations. He can exchange the combination together and does not have to worry about replacing individual products separately. In particular, he does not need to worry about an additional dosage of clear rinser in the rinsing chamber of the dishwasher.

DETAILED DESCRIPTION OF THE INVENTION

The subject of this application is corresponding cleaning agent product forms which are obtained by combining three liquid cleaning agent preparations A, B and C. The liquid cleaning agent preparations A, B and C differ from one another with regard to their composition.

Unless explicitly indicated otherwise, all percentages that are cited in connection with the compositions described herein refer to wt. %, in each case based on the relevant mixture. If states of matter (solid, liquid) are mentioned in the present application, these relate, unless otherwise stated, to room temperature (20° C.) at normal pressure of 1 bar.

The cleaning agent product form is characterized in that the cleaning agent preparations are phosphate-free, i.e. in that they contain less than 1 wt. % phosphate, preferably less than 0.5 wt. % phosphate, particularly preferably less than 0.1 wt. % phosphate and in particular no phosphate.

Cleaning agent preparation A contains one or more builders as a first essential component. The builders include in particular carbonates, organic cobuilders, and silicates. Cleaning agent product forms according to the invention are preferably characterized in that the builder a1) is selected from the group of carbonates, hydrogen carbonates, citrates, silicates, polymeric carboxylates and sulfonic acid group-containing polymers or mixtures thereof.

Preferred cleaning agent product forms comprise a cleaning agent preparation A containing, based on the total weight thereof, 2 to 50 wt. %, preferably 6 to 45 wt. %, and in particular 10 to 40 wt. %, builder.

It is particularly preferred to use builders a1) from the group of carbonates and/or hydrogen carbonates, preferably alkali carbonates, particularly preferably sodium carbonate, in amounts of from 2 to 30 wt. %, preferably from 3 to 20 wt. %, and in particular from 4 to 15 wt. %, in each case based on the weight of cleaning agent preparation A.

Polycarboxylates/polycarboxylic acids, polymeric carboxylates, (poly)aspartic acid, polyacetals, dextrins and organic cobuilders are particularly noteworthy as organic cobuilders. These classes of substances are described below.

Organic builders that can be used are the polycarboxylic acids that can be used in the form of the free acids and/or the sodium salts thereof, for example, with polycarboxylic acids being understood to mean those carboxylic acids which carry more than one acid function. These include, for example, citric acid, adipic acid, succinic acid, glutaric acid, malic acid, tartaric acid, maleic acid, fumaric acid, saccharic acids, provided that the use thereof is not objectionable for ecological reasons, and mixtures thereof. Polycarboxylic acids are preferably understood to mean non-polymeric polycarboxylates. Such polymeric polycarboxylates have a larger number, preferably 4 or more, carboxylic acid-containing monomers. In addition to their builder effect, the free acids typically also have the property of being an acidification component and are thus also used for setting a lower and milder pH of cleaning agents. Particularly noteworthy here are citric acid, succinic acid, glutaric acid, adipic acid, gluconic acid, and any mixtures thereof.

Particularly preferred cleaning agent preparations A according to the invention contain citrate as one of their essential builders. Cleaning agent product forms characterized in that cleaning agent preparation A contains, based on the total weight thereof, 2 to 40 wt. %, preferably 5 to 30 wt. %, and in particular 7 to 20 wt. %, citrate are preferred according to the invention. Citrate and citric acid have proven to be the most effective builders in terms of cleaning performance, such as rinsing performance and in particular deposit inhibition, in particular in combination with phosphonate, in particular 1-hydroxyethane-1,1-diphosphonic acid, and/or sulfonic acid group-containing polymers.

Polymeric polycarboxylates are also suitable as builders. These are, for example, the alkali metal salts of polyacrylic acid or polymethacrylic acid, for example those having a relative molecular mass of from 500 to 70,000 g/mol.

Suitable polymers are in particular polyacrylates which preferably have a molecular mass of from 2,000 to 20,000 g/mol. Due to their superior solubility, the short-chain polyacrylates, which have molar masses of from 2,000 to 10,000 g/mol, and particularly preferably from 3,000 to 5,000 g/mol, can in turn be preferred from this group.

In addition, copolymeric polycarboxylates are suitable, in particular those of acrylic acid with methacrylic acid and of acrylic acid or methacrylic acid with maleic acid. Copolymers of acrylic acid with maleic acid which contain from 50 wt. % to 90 wt. % of acrylic acid and from 50 wt. % to 10 wt. % of maleic acid have been found to be particularly suitable. The relative molecular mass thereof, based on free acids, is generally from 2,000 to 70,000 g/mol, preferably from 20,000 to 50,000 g/mol, and in particular from 30,000 to 40,000 g/mol.

The content of (co) polymeric polycarboxylates in the automatic dishwashing detergent is preferably from 0.5 to 20 wt. % and in particular from 3 to 10 wt. %.

Automatic dishwashing detergents according to the invention can also contain, as a builder, crystalline layered silicates of the general formula $NaMSi_xO_{2x+1}\cdot yH_2O$, where M represents sodium or hydrogen, x is a number from 1.9 to 22, preferably from 1.9 to 4, with 2, 3, or 4 being particularly preferred values for x, and y represents a number from 0 to 33, preferably from 0 to 20.

Amorphous sodium silicates with an $Na_2O:SiO_2$ modulus of 1:2 to 1:3.3, preferably 1:2 to 1:2.8, and in particular 1:2 to 1:2.6 can also be used which preferably have retarded dissolution and secondary washing properties.

In preferred automatic dishwashing detergents according to the invention, the silicate content, based on the total weight of the automatic dishwashing detergent, is limited to amounts below 10 wt. %, preferably below 5 wt. %, and in particular below 2 wt. %. Particularly preferred automatic dishwasher detergents according to the invention are silicate-free.

The automatic dishwasher detergents according to the invention can of course contain the above-mentioned builders both in the form of individual substances and in the form of substance mixtures composed of two, three, four or more builders.

Particularly preferred liquid automatic dishwashing detergents are characterized in that the dishwashing detergent contains at least two builders from the group of carbonates and citrates, and sulfonic acid group-containing polymers, the proportion by weight of these builders being preferably 2 to 50 wt. %, more preferably 5 to 45 wt. %, and in particular 10 to 40 wt. %, based on the total weight of the automatic dishwashing detergent. The combination of two or more builders from the above-mentioned group has proven advantageous for the cleaning and rinsing performance of automatic dishwashing detergents according to the invention.

A sulfopolymer, preferably a copolymeric polysulfonate, preferably a hydrophobically modified copolymeric polysulfonate, is preferably used as a sulfonic group-containing polymer. The copolymers can have two, three, four, or more different monomer units. Preferred copolymeric polysulfonates contain, besides sulfonic acid group-containing monomer(s), at least one monomer from the group of unsaturated carboxylic acids.

As the unsaturated carboxylic acid(s), unsaturated carboxylic acids of the formula $R^1(R^2)C{=}C(R^3)$ COOH are particularly preferably used, in which $R^1$ to $R^3$, independently of one another, represent —H, —$CH_3$, a straight-chain or branched saturated alkyl functional group having 2 to 12 carbon atoms, a straight-chain or branched, mono- or polyunsaturated alkenyl functional group having 2 to 12 carbon atoms, —$NH_2$, —OH, or —COOH-substituted alkyl or alkenyl functional groups as defined above, or represent —COOH or —$COOR^4$, where $R^4$ is a saturated or unsaturated, straight-chain or branched hydrocarbon functional group having 1 to 12 carbon atoms.

Particularly preferred unsaturated carboxylic acids are acrylic acid, methacrylic acid, ethacrylic acid, α-chloroacrylic acid, α-cyanoacrylic acid, crotonic acid, α-phenylacrylic acid, maleic acid, maleic anhydride, fumaric acid, itaconic acid, citraconic acid, methylene malonic acid, sorbic acid, cinnamic acid, or mixtures thereof. Unsaturated dicarboxylic acids can obviously also be used.

For sulfonic acid group-containing monomers, those of the formula $R^5(R^6)C{=}C(R^7)$—X—$SO_3H$ are preferred, in which $R^5$ to $R^7$ represent, independently of one another, —H, —$CH_3$, a straight-chain or branched saturated alkyl functional group having 2 to 12 carbon atoms, a straight-chain or branched, mono- or polyunsaturated alkenyl functional group having 2 to 12 carbon atoms, —$NH_2$, —OH, or —COOH-substituted alkyl or alkenyl functional groups, or represent —COOH or —COOR$^4$, where $R^4$ is a saturated or unsaturated, straight-chain or branched hydrocarbon functional group having 1 to 12 carbon atoms, and X represents an optionally present spacer group that is selected from $-(CH_2)_n-$, where n=0 to 4, $-COO-(CH_2)_k-$, where k=1 to 6, $-C(O)-NH-C(CH_3)_2-$, $-C(O)-NH-C(CH_3)_2-CH_2-$ and $-C(O)-NH-CH(CH_3)-CH_2-$.

Among these monomers, those of formulas $H_2C{=}CH-X-SO_3H$, $H_2C{=}C(CH_3)-X-SO_3H$ or $HO_3S-X-(R^6)C{=}C(R^7)-X-SO_3H$ are preferred, in which $R^6$ and $R^7$, independently of one another, are selected from —H, $-CH_3$, $-CH_2CH_3$, $-CH_2CH_2CH_3$ and $-CH(CH_3)_2$, and X represents an optionally present spacer group that is selected from $-(CH_2)_n-$, where n=0 to 4, $-COO-(CH_2)_k-$, where k=1 to 6, $-C(O)-NH-C(CH_3)_2-$, $-C(O)-NH-C(CH_3)_2-CH_2-$ and $-C(O)-NH-CH(CH_3)-CH_2-$.

According to a particularly preferred embodiment, a cleaning agent preparation, preferably cleaning agent preparation A, comprises a polymer comprising, as a sulfonic acid group-containing monomer, acrylamidopropanesulfonic acids, methacrylamidomethylpropanesulfonic acids or acrylamidomethylpropanesulfonic acid.

Particularly preferred sulfonic acid group-containing monomers are 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxy-propanesulfonic acid, allyl sulfonic acid, methallyl sulfonic acid, allyloxybenzene sulfonic acid, methallyloxybenzene sulfonic acid, 2-hydroxy-3-(2-propenyloxy) propanesulfonic acid, 2-methyl-2-propene-1-sulfonic acid, styrene sulfonic acid, vinylsulfonic acid, 3-sulfopropyl acrylate, 3-sulfopropyl methacrylate, sulfomethacrylamide, sulfomethylmethacrylamide, and mixtures of the above acids or water-soluble salts thereof. The sulfonic acid groups can be present in the polymers in a fully or partially neutralized form, i.e. the acidic hydrogen atom of the sulfonic acid group can be replaced in some or all of the sulfonic acid groups with metal ions, preferably alkali metal ions, and in particular with sodium ions. The use of partially or fully neutralized sulfonic acid group-containing copolymers is preferred according to the invention.

In copolymers that contain only carboxylic acid group-containing monomers and sulfonic acid group-containing monomers, the monomer distribution of the copolymers that are preferably used according to the invention is preferably 5 to 95 wt. % in each case; particularly preferably, the proportion of the sulfonic acid group-containing monomer is 50 to 90 wt. %, and the proportion of the carboxylic acid group-containing monomer is 10 to 50 wt. %, with the monomers preferably being selected from those mentioned above. The molar mass of the sulfo-copolymers that are preferably used according to the invention can be varied in order to adapt the properties of the polymers to the desired intended use. Preferred cleaning agents are characterized in that the copolymers have molar masses of from 2,000 to 200,000 $g \cdot mol^{-1}$, preferably from 4,000 to 25,000 $g \cdot mol^{-1}$ and in particular from 5,000 to 15,000 $g \cdot mol^{-1}$.

In another preferred embodiment, the copolymers comprise not only carboxyl group-containing monomers and sulfonic acid group-containing monomers but also at least one non-ionic, preferably hydrophobic monomer. In particular the rinsing performance of dishwashing detergents according to the invention was able to be improved by using these hydrophobically modified polymers.

Particularly preferably, the cleaning agent preparations, in particular cleaning agent preparation A, comprise a copolymer, comprising i) carboxylic acid group-containing monomers
ii) sulfonic acid group-containing monomers
iii) optionally non-ionic monomers, in particular hydrophobic monomers.

As the non-ionic monomers, monomers of the general formula $R^1(R^2)C{=}C(R^3)-X-R^4$ are preferably used, in which $R^1$ to $R^3$ represent, independently of one another, —H, $-CH_3$ or $-C_2H_5$, X represents an optionally present spacer group selected from $-CH_2-$, $-C(O)O-$ und $-C(O)-NH-$, and $R^4$ represents a straight-chain or branched saturated alkyl functional group having 2 to 22 carbon atoms or an unsaturated, preferably aromatic functional group having 6 to 22 carbon atoms.

Particularly preferred non-ionic monomers are butene, isobutene, pentene, 3-methylbutene, 2-methylbutene, cyclopentene, hexene, hexene-1,2-methlypentene-1, 3-methlypentene-1, cyclohexene, methylcyclopentene, cycloheptene, methylcyclohexene, 2,4,4-trimethylpentene-1, 2,4,4-trimethylpentene-2,2,3-dimethylhexene-1, 2,4-dimethylhexene-1, 2,5-dimethylhexene-1, 3,5-dimethylhexene-1, 4,4-dimethylhexane-1, ethylcyclohexene, 1-octene, α-olefins having 10 or more carbon atoms such as 1-decene, 1-dodecene, 1-hexadecene, 1-octadecene and $C_{22}$ α-olefin, 2-styrene, α-methylstyrene, 3-methylstyrene, 4-propylstyrene, 4-cyclohexylstyrene, 4-dodecylstyrene, 2-ethyl-4-benzylstyrene, 1-vinyl naphthalene, 2-vinyl naphthalene, acrylic acid methyl ester, acrylic acid ethyl ester, acrylic acid propyl ester, acrylic acid butyl ester, acrylic acid pentyl ester, acrylic acid hexyl ester, methacrylic acid methyl ester, N-(methyl) acrylamide, acrylic acid-2-ethylhexyl ester, methacrylic acid-2-ethylhexyl ester, N-(2-ethylhexyl) acrylamide, acrylic acid octyl ester, methacrylic acid octyl ester, N-(octyl) acrylamide, acrylic acid lauryl ester, methacrylic acid lauryl ester, N-(lauryl) acrylamide, acrylic acid stearyl ester, methacrylic acid stearyl ester, N-(stearyl) acrylamide, acrylic acid behenyl ester, methacrylic acid behenyl ester and N-(behenyl) acrylamide, or mixtures thereof, in particular acrylic acid, ethyl acrylate, 2-acrylamido-2-methylpropane sulfonic acid (AMPS) and mixtures thereof.

As a second essential component, cleaning agent preparation A contains a complexing agent which is different from the above-mentioned builders. The proportion by weight of the complexing agent with respect to the total weight of cleaning agent preparation A is preferably 2 to 60 wt. %, more preferably 3 to 55 wt. %, even more preferably 4 to 55 wt. % and in particular 8 to 50 wt. %.

A first group of preferred complexing agents are phosphonates. In addition to 1-hydroxyethane-1,1-diphosphonic acid, the complexing phosphonates include a number of different compounds such as diethylenetriamine penta(methylene phosphonic acid) (DTPMP). Hydroxy alkane or amino alkane phosphonates are particularly preferred in this application. Among the hydroxy alkane phosphonates, 1-hydroxyethane-1,1-diphosphonate (HEDP) has particular significance as a cobuilder. It is preferably used as a sodium salt, the disodium salt reacting neutral and the tetrasodium salt reacting alkaline (pH 9). Possible preferable aminoalkane phosphonates include ethylenediamine tetramethylene phosphonate (EDTMP), diethylentriamine pentamethylene phosphonate (DTPMP) and the higher homologs thereof. They are preferably used in the form of the neutrally reacting sodium salt, for example as the hexasodium salt of EDTMP or as the hepta- and octa-sodium salt of DTPMP. Of the class of phosphonates, HEDP is preferably used as a complexing agent. The aminoalkane phosphonates additionally have a pronounced heavy-metal-binding power. Accordingly, it may be preferred, in particular if the agents also contain bleach, to use aminoalkane phosphonates, in particular DTPMP, or to use mixtures of the mentioned phosphonates.

A cleaning agent preparation A preferred in the context of this application contains one or more phosphonate(s) from the group a) aminotrimethylene phosphonic acid (ATMP) and/or the salts thereof;
b) ethylenediamine tetra(methylene phosphonic acid) (EDTMP) and/or the salts thereof;
c) diethylenetriamine penta(methylene phosphonic acid) (DTPMP) and/or the salts thereof;
d) 1-hydroxyethane-1,1-diphosphonic acid (HEDP) and/or the salts thereof;
e) 2-phosphonobutane-1,2,4-tricarboxylic acid (PBTC) and/or the salts thereof;
f) hexamethylenediamine tetra(methylene phosphonic acid) (HDTMP) and/or the salts thereof;
g) nitrilotri(methylene phosphonic acid) (NTMP) and/or the salts thereof.

Particularly preferred cleaning agent preparations A are those which contain 1-hydroxyethane-1,1-diphosphonic acid (HEDP) or diethylenetriaminepenta(methylene phosphonic acid) (DTPMP) as phosphonates.

The automatic dishwashing detergent according to the invention may, of course, contain two or more different phosphonates. The proportion by weight of the phosphonates with respect to the total weight of cleaning agent preparations A according to the invention is preferably 1 to 8 wt. %, more preferably 1.2 to 6 wt. %, even more preferably 1.3 to 5 wt. %, particularly preferably 1.4 to 4.5 wt. %, and in particular 1.5 to 4 wt. %.

Particularly preferred cleaning agent product forms are characterized in that the complexing agent a2) is selected from the group consisting of hydroxyethyl-ethylenediamin-etriacetic acid, ethylenediaminetetraacetic acid, diethylen-etriaminepentaacetic acid, glutamic acid diacetic acid, in particular L-glutamic acid-N,N-diacetic acid, iminodisuccinic acid, hydroxyimino-disuccinic acid, methylglycinediacetic acid, aspartic acid diacetic acid, hydroxyethane-1,1-diphosphonic acid or diethylenetriaminepenta (methylenephosphonic acid) and the salts or mixtures thereof, preferably L-glutamic acid-N,N-diacetic acid and/or methylglycinediacetic acid and the salts thereof. The terms methylglycinediacetic acid and L-glutamic acid-N,N-diacetic acid include not only the free acids but also the salts thereof, for example the sodium or potassium salts thereof.

As particularly preferred complexing agents, cleaning agent preparations A according to the invention can contain in particular L-glutamic acid-N,N-diacetic acid and/or the corresponding alkali salt (GLDA), preferably the tetrasodium salt, and/or methylglycinediacetic acid and/or the corresponding alkali salt, preferably the trisodium salt. Very particularly preferably, the trisodium salt of methylglycinediacetic acid (MGDA) or the corresponding sodium salts are contained, preferred cleaning agent preparations A being characterized in that they contain, based on the total weight of cleaning agent preparations A, 3.0 to 35 wt. %, preferably 4.0 to 30 wt. % and in particular 8.0 to 25 wt. %, methylglycinediacetic acid.

According to a particularly preferred embodiment, cleaning agent preparation A contains the complexing agents selected from phosphonates, in particular HEDP, if permitted for regulatory reasons, and/or MGDA and the respective salts thereof. In particular, the builders include citrate and carbonate and/or hydrogen carbonate.

According to a particularly preferred embodiment of the cleaning agent product form, cleaning agent preparation A contains, in each case based on its total weight, MGDA and/or the salts thereof in amounts of from 5 to 30 wt. %, in particular 8 to 25 wt. %, for example 10 to 15 wt. %, citrate in amounts of from 3 to 20 wt. %, in particular from 4 to 15 wt. %, and carbonate in amounts of from 5 to 30 wt. %, in particular 7 to 20 wt. %.

In addition to citrate in amounts of from 3 to 20 wt. %, in particular from 4 to 15 wt. %, and carbonate in amounts of from 5 to 30 wt. %, in particular 7 to 20 wt. %, phosphonate and/or the salt thereof is also preferably contained in amounts of from 1.2 to 6 wt. %, particularly preferably 1.4 to 4.5 wt. %, in particular 1.5 to 4 wt. %, if permitted for regulatory reasons.

In a preferred embodiment according to the invention, one of the cleaning agent preparations, preferably cleaning agent preparation B, further contains at least one surfactant, in particular selected from anionic, non-ionic, zwitterionic and amphoteric surfactants. Alternatively, the surfactants can also be contained in a cleaning agent preparation different from cleaning agent preparations A and B. Surfactants are contained in a cleaning agent preparation B according to the invention, if used, preferably in an amount of up to 40 wt. %, in particular 2 to 40 wt. % or 4 to 40 wt. %, particularly preferably in an amount of from 5 to 35 wt. %, in particular 10 to 30 wt. %.

Preferably, cleaning agent preparation A contains less than 2 wt. % surfactant, preferably less than 1 wt. % surfactant, particularly preferably less than 1 wt. % surfactant, in particular no surfactant, in each case based on the total weight of cleaning agent preparation A.

Non-ionic surfactants that are preferably used are alkoxylated, advantageously ethoxylated, in particular primary alcohols having preferably 8 to 18 C atoms and, on average, 1 to 12 mols of ethylene oxide (EO) per mol of alcohol, in which the alcohol functional group can be linear or preferably methyl-branched in the 2 position, or can contain linear and methyl-branched functional groups in admixture, as are usually present in oxo alcohol functional groups. However, alcohol ethoxylates having linear functional groups of alcohols of native origin having 12 to 18 C atoms, for example of coconut, palm, tallow fatty or oleyl alcohol, and, on average, 2 to 8 EO per mol of alcohol are particularly preferred. Preferred ethoxylated alcohols include $C_{12}$-14 alcohols having 3 EO, 4 EO or 7 EO, $C_9$-11 alcohols having 7 EO, $C_{13}$-15 alcohols having 3 EO, 5 EO, 7 EO or 8 EO, $C_{12}$-18 alcohols having 3 EO, 5 EO or 7 EO, and mixtures thereof, such as mixtures of $C_{12}$-14 alcohol having 3 EO and $C_{12}$-18 alcohol having 7 EO. The degrees of ethoxylation indicated represent statistical averages that can correspond to an integer or a fractional number for a specific product. Preferred alcohol ethoxylates have a narrowed homolog distribution (narrow range ethoxylates, NRE). In addition to these non-ionic surfactants, fatty alcohols having more than 12 EO can also be used. Examples of these are tallow fatty alcohols having 14 EO, 25 EO, 30 EO, or 40 EO. Non-ionic surfactants that contain EO and PO groups together in the molecule can also be used according to the invention. Block copolymers having EO-PO block units or PO-EO block units can be used here, but also EO-PO-EO copolymers or PO-EO-PO copolymers. Of course, mixed alkoxylated non-ionic surfactants can also be used, in which EO and PO units are not distributed in blocks but rather statistically. Such products can be obtained by the simultaneous action of ethylene oxide and propylene oxide on fatty alcohols.

In a preferred embodiment, the content of non-ionic surfactants in cleaning preparation B is 5 to 30 wt. %, preferably 7 to 20 wt. %, and in particular 9 to 15 wt. %, based on the total amount of cleaning preparation B.

In addition to the non-ionic surfactants, cleaning preparation B can also contain anionic surfactants. Anionic surfactants that are used are those of the sulfonate and sulfate types, for example. Surfactants of the sulfonate type that can be used are preferably $C_{9-13}$ alkylbenzene sulfonates, olefin sulfonates, i.e. mixtures of alkene and hydroxyalkane sulfonates, and disulfonates, as obtained, for example, from $C_{12-18}$ monoolefins having a terminal or internal double bond by way of sulfonation with gaseous sulfur trioxide and subsequent alkaline or acid hydrolysis of the sulfonation products. Also suitable are alkane sulfonates obtained from $C_{12-18}$ alkanes, for example by way of sulfochlorination or sulfoxidation with subsequent hydrolysis or neutralization. The esters of α-sulfofatty acids (ester sulfonates) are also suitable, for example the α-sulfonated methyl esters of hydrogenated coconut, palm kernel or tallow fatty acids. The anionic surfactants, including the soaps, can be present in the form of the sodium, potassium or ammonium salts thereof, or as soluble salts of organic bases, such as monoethanolamine, diethanolamine or triethanolamine. The anionic surfactants are preferably present in the form of the sodium or potassium salts thereof, in particular in the form of the sodium salts.

In a preferred embodiment, the content of anionic surfactants in cleaning preparation B is 0.1 to 30 wt. %, preferably 2 to 20 wt. %, based on the total amount of cleaning preparation B.

A preferred pH of cleaning agent preparations A according to the invention is between 9 and 14, in particular 9 and 12. If necessary, the pH can be adjusted by means of appropriate pH adjusters, in particular sodium or potassium hydroxide.

Cleaning agent preparations B according to the invention contain at least one cleaning-active enzyme as the first essential component thereof. The proportion by weight of the cleaning-active enzyme preparation with respect to the total weight of cleaning agent preparation B is preferably 5 and 80 wt. %, more preferably 5 and 60 wt. %, particularly preferably 10 and 50 wt. % and in particular 10 and 30 wt. %. The enzyme preparations used in this way each contain from 0.1 to 40 wt. %, preferably from 0.2 to 30 wt. %, particularly preferably from 0.4 to 20 wt. % and in particular from 0.8 to 10 wt. %, active enzyme protein.

The enzymes used with particular preference include, in particular, proteases, amylases, lipases, hemicellulases, cellulases, perhydrolases, or oxidoreductases, and preferably mixtures thereof. Said enzymes are in principle of natural origin; proceeding from the natural molecules, improved variants for use in cleaning agents are available which are preferably used accordingly. Cleaning agents according to the invention preferably contain enzymes in total amounts of from $1\times10^{-6}$ wt. % to 5 wt. % based on active protein. The protein concentration can be determined using known methods, for example the BCA method or the Biuret method.

The stabilizing effect according to the invention was observed in particular with the amylases, proteases, cellulases and mannanases, which is why liquid cleaning agent preparations B according to the invention, characterized in that they contain at least one cleaning-active enzyme from the group of amylases and/or proteases and/or cellulases and/or mannanases, in particular from the group of amylases and/or proteases, are preferred.

Among the proteases, the subtilisin-type proteases are preferred. Examples of these are the subtilisins BPN' and Carlsberg, as well as the further developed forms thereof, protease PB92, subtilisins 147 and 309, the alkaline protease from *Bacillus lentus*, subtilisin DY, and the enzymes thermitase, proteinase K and proteases TW3 and TW7, which belong to the subtilases but no longer to the subtilisins in the narrower sense.

Liquid cleaning agent preparations B that are preferred according to the invention contain, based on the total weight of the cleaning agent preparation, 5 to 50 wt. %, preferably 7 to 40 wt. %, and in particular 10 to 30 wt. %, protease preparations. Cleaning agent preparations B are particularly preferred which contain, based on their total weight, 15 to 25 wt. % protease preparations.

Examples of amylases that can be used according to the invention are α-amylases from *Bacillus licheniformis*, from *B. amyloliquefaciens*, from *B. stearothermophilus*, from *Aspergillus niger*, and *A. oryzae*, as well as the further developments of the above-mentioned amylases that have been improved for use in cleaning agents. Others that are particularly noteworthy for this purpose are the α-amylases from *Bacillus* sp. A 7-7 (DSM 12368) and cyclodextrin glucanotransferase (CGTase) from *B. agaradherens* (DSM 9948).

Liquid cleaning agent preparations B that are preferred according to the invention contain, based on the total weight of the cleaning agent preparation, 0.1 to 30 wt. %, preferably 1.0 to 25 wt. %, and in particular 2.0 to 20 wt. %, amylase preparations. Cleaning agent preparations B are particularly preferred which contain, based on their total weight, 4.0 to 16 wt. % amylase preparations.

Further liquid cleaning preparations B that are preferred according to the invention contain, based on the total weight of the cleaning agent preparation, 0.1 to 30 wt. %, preferably 1.0 to 25 wt. %, and in particular 2.0 to 20 wt. %, cellulase preparations.

Further liquid cleaning preparations B that are preferred according to the invention contain, based on the total weight of the cleaning agent preparation, 0.1 to 30 wt. %, preferably 1.0 to 25 wt. %, and in particular 2.0 to 20 wt. %, mannanase preparations.

Furthermore, lipases or cutinases can be used according to the invention, in particular due to their triglyceride-cleaving activities, but also in order to produce peracids in situ from suitable precursors. These include, for example, the lipases that can originally be obtained from *Humicola lanuginosa* (*Thermomyces lanuginosus*) or have been developed therefrom, in particular those having the amino acid exchange D96L. Moreover, the cutinases which have been originally isolated from *Fusarium solani pisi* and *Humicola insolens* can also be used, for example. Lipases and/or cutinases of which the starting enzymes have been isolated originally from *Pseudomonas mendocina* and *Fusarium solanii* can also be used.

Further liquid cleaning preparations B that are preferred according to the invention contain, based on the total weight of the cleaning agent preparation, 0.1 to 30 wt. %, preferably 1.0 to 25 wt. %, and in particular 2.0 to 20 wt. %, lipase preparations.

Moreover, enzymes can be used which can be grouped together under the term hemicellulases. In addition to the above-mentioned mannanases, these include, for example, xanthan lyases, pectin lyases (=pectinases), pectinesterases, pectate lyases, xyloglucanases (=xylanases), pullulanases, and β-glucanases.

In order to increase the bleaching effect, oxidoreductases such as oxidases, oxygenases, catalases, peroxidases such as halo-, chloro-, bromo-, lignin, glucose, or manganese peroxidases, dioxygenases or laccases (phenoloxidases, polyphenoloxidases) can be used according to the invention. Advantageously, organic, particularly preferably aromatic compounds that interact with the enzymes are additionally added in order to potentiate the activity of the relevant oxidoreductases (enhancers) or, in the event of greatly differing redox potentials, to ensure the flow of electrons between the oxidizing enzymes and the contaminants (mediators).

Cleaning-active enzymes, in particular proteases and amylases, are generally not made available in the form of the pure protein, but rather in the form of stabilized, storable and transportable preparations. These pre-formulated preparations include, for example, the solid preparations obtained through granulation, extrusion, or lyophilization or, in particular in the case of liquid or gel agents, solutions of the enzymes, advantageously maximally concentrated, low-water, and/or supplemented with stabilizers or other auxiliaries.

Alternatively, the enzymes can also be encapsulated, for both the solid and the liquid administration form, for example by spray-drying or extrusion of the enzyme solution together with a preferably natural polymer or in the form of capsules, for example those in which the enzymes are enclosed in a set gel, or in those of the core-shell type, in which an enzyme-containing core is coated with a water-, air-, and/or chemical-impermeable protective layer. Other active ingredients such as stabilizers, emulsifiers, pigments, bleaching agents, or dyes can additionally be applied in overlaid layers. Such capsules are applied using inherently known methods, for example by shaking or roll granulation or in fluidized bed processes. Such granules are advantageously low in dust, for example due to the application of polymeric film-formers, and storage-stable due to the coating.

Moreover, it is possible to formulate two or more enzymes together, such that a single granule exhibits a plurality of enzyme activities.

As is clear from the preceding remarks, the enzyme protein forms only a fraction of the total weight of conventional enzyme preparations. Enzyme preparations that are preferably used according to the invention, in particular the protease and amylase preparations, contain from 0.1 to 40 wt. %, preferably from 0.2 to 30 wt. %, particularly preferably from 0.4 to 20 wt. % and in particular from 0.8 to 10 wt. %, of the enzyme protein.

Liquid cleaning agent preparations B that are particularly preferred according to the invention therefore contain, based on the total weight of the cleaning agent preparation, 7 to 40 wt. %, preferably 10 to 30 wt. %, protease preparations, and 2 to 20 wt. %, in particular 4.0 to 16 wt. %, amylase preparations, used, which each contain 0.4 to 20 wt. %, in particular 0.8 to 10 wt. %, active protein.

A plurality of enzymes and/or enzyme preparations, preferably liquid protease preparations and/or amylase preparations, and optionally cellulase preparations and/or mannanase preparations, are preferably used.

A preferred pH of cleaning agent preparations B according to the invention is between 6 and 9.

Cleaning agent preparations B of the cleaning agent product form according to the invention contain preferably less than 2.5 wt. % complexing agent. They preferably contain less than 2.5 wt. % complexing agents and/or builders. Lowering the complexing agent content below these upper limits has proven to be advantageous for cleaning performance. By further lowering the content of complexing agents well below the upper limits, a further increase in the cleaning performance of cleaning agent product forms according to the invention can surprisingly be achieved.

Cleaning agent product forms that are preferred according to the invention are characterized in that cleaning agent preparation B contains less than 2.0 wt. % complexing agent, preferably less than 1.0 wt. % complexing agent, particularly preferably less than 0.5 wt. % complexing agent and in particular no complexing agent.

The total amount of the complexing agent and/or builders contained in cleaning agent preparation B is preferably less than 10 wt. %, more preferably less than 6 wt. %, particularly preferably less than 2 wt. %, and in particular 0 wt. %.

An optional component of the cleaning agent preparations according to the invention, in particular cleaning agent preparation B, are organic solvents. Preferred organic solvents are derived from the group of monohydric or polyhydric alcohols, alkanolamines or glycol ethers. The solvents are preferably selected from ethanol, n-propanol or i-propanol, butanol, glycol, propanediol or butanediol, glycerol, monoethanolamine, diglycol, propyl diglycol or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether or propylene glycol propyl ether, dipropylene glycol methyl ether or dipropylene glycol ethyl ether, methoxytriglycol, ethoxytriglycol or butoxytriglycol, 1-butoxyethoxy-2-propanol, 3-methyl-3-methoxybutanol, propylene-glycol-t-butylether, and mixtures of these solvents. Preferred solvents are preferably selected from glycerol, 1,2-propylene glycol, 1,3-propylene glycol, dipropylene glycol and polyethylene glycols, in particular polyethylene glycols having an average molecular weight between 100 and 800, preferably 200 and 600 g/mol. The proportion by weight of this organic solvent with respect to the total weight of each of the cleaning agent preparations according to the invention is preferably 5 to 80 wt. %, preferably 10 to 60 wt. % and in particular 20 to 50 wt. %.

A particularly preferred organic solvent which is particularly effective in stabilizing the cleaning agent, in particular cleaning agent B, is 1,2-propylene glycol. The proportion by weight of the 1,2-propylene glycol with respect to the total weight of cleaning agent preparations B according to the invention can vary within wide limits, although preparations have proven to be particularly stable which contain, based on the total weight of the particular cleaning agent preparation B, 5 to 80 wt. %, preferably 10 to 60 wt. %, and in particular 20 to 50 wt. %, 1,2-propylene glycol. Corresponding preparations are therefore preferred according to the invention.

Another optional component of cleaning agent preparations B according to the invention is a boric acid or a boric acid derivative. In addition to boric acids, in particular boronic acids or the salts or esters thereof are preferably used, including above all derivatives having aromatic groups, for example ortho-, meta- or para-substituted phenylboronic acids, in particular 4-formylphenylboronic acid (4-FPBA), or the salts or esters of the mentioned compounds. The proportion by weight of the boric acid or boric acid derivates with respect to the total weight of cleaning agent preparations B according to the invention is preferably 0.001 to 10 wt. %, preferably 0.002 to 6 wt. % and in particular 0.05 to 3 wt. %.

A particularly preferred boric acid derivative which is particularly effective in stabilizing the cleaning agent preparation is 4-formylphenyl boronic acid. The proportion by weight of the 4-formylphenyl boronic acid with respect to the total weight of the cleaning agent preparations according to the invention can vary within wide limits, although preparations have proven to be particularly stable which contain, based on the total weight of cleaning agent preparation B, 0.001 to 10 wt. %, preferably 0.002 to 6 wt. %, and in particular 0.05 to 3 wt. %. Corresponding preparations are therefore preferred according to the invention.

Another optional component of the cleaning agent preparations according to the invention is a Ca or Mg ion source. The proportion by weight of the Ca or Mg ion source with respect to the total weight of cleaning agent preparations B according to the invention is preferably 0.01 to 10 wt. %, preferably 0.2 to 8 wt. %, and in particular 0.5 to 5 wt. %.

The organic calcium salts have proven to be particularly preferred and particularly effective Ca ion sources for stabilizing cleaning agent preparation B.

The proportion by weight of the organic calcium salts with respect to the total weight of the cleaning agent preparations according to the invention can vary within wide limits, although preparations have proven to be particularly stable which contain, based on the total weight of the cleaning agent preparation, 0.01 to 10 wt. %, preferably 0.2 to 8 wt. %, and in particular 0.5 to 5 wt. %. Corresponding preparations are therefore preferred according to the invention.

For enzyme stabilization, cleaning agent preparations B according to the invention can also contain polyols, in particular sorbitol.

Liquid cleaning agent preparations B contain, based on their total weight, preferably 30 wt. % and less, more preferably 25 wt. % and less, in particular 15 wt. % and less, water. In a further preferred embodiment, cleaning agent preparations B contain, based on the total weight thereof, 0.5 to 30 wt. %, preferably 1.0 to 25 wt. %, and in particular 1.5 to 30 wt. %, water.

In a preferred embodiment, the cleaning agent product form further comprises a liquid cleaning agent preparation C, with cleaning agent preparation C being different from cleaning agent preparations A and B.

In the cleaning agent product form according to the invention and in the automatic dishwashing method according to the invention, cleaning agent preparations A and B are used in combination with at least one further cleaning agent preparation C. Cleaning agent preparation C is liquid (20° C.), phosphate-free and contains at least one acidifying agent and a glass corrosion inhibitor.

Cleaning agent preparations C according to the invention contain at least one acidifying agent. Acidifying agents can be added to cleaning agent preparations C according to the invention in order to lower the pH of the liquor in the rinse cycle. Both inorganic acids and organic acids are suitable here, provided that they are compatible with the other ingredients. For reasons of consumer protection and handling safety, the solid mono-, oligo- and polycarboxylic acids in particular can be used. From this group, formic acid, citric acid, tartaric acid, succinic acid, malonic acid, adipic acid, maleic acid, fumaric acid, oxalic acid and polyacrylic acid are again preferred. Organic sulfonic acids such as sulfamic acid can also be used. Sokalan® DOS (trademark of BASF), a mixture of succinic acid (max. 31 wt. %), glutaric acid (max. 50 wt. %) and adipic acid (max. 33 wt. %), is commercially available and preferably also used as an acidifying agent in the context of the present invention. Cleaning preparations C, which, based on the total weight of cleaning agent preparation C, contain one or more acidifying agents, preferably mono-, oligo- and polycarboxylic acids, particularly preferably formic acid, tartaric acid, succinic acid, malonic acid, adipic acid, maleic acid, fumaric acid, oxalic acid and polyacrylic acid, and in particular formic acid, acetic acid and/or citric acid in amounts of from 0.1 to 12 wt. %, preferably 0.2 to 10 wt. %, and in particular 0.3 to 8.0 wt. %, are preferred embodiments of the present invention.

The use of formic acid is preferred because, in addition to its acid function for improving the rinsing result, it also has a positive effect on the storage stability of cleaning preparation C, which is subject to strong temperature fluctuations due to storage in the interior of the dishwasher, as explained above. It also has a disinfectant effect, and therefore the number of bacteria is reduced when formic acid is used in the rinse cycle. This applies both to bacteria that are in the rinsing liquor of the rinse cycle and to those that are in the rinsing liquor remaining in the bottom of the dishwasher during and after the washing process and in the interior of the dishwasher. This can also reduce the number of residual germs on the washed dishes.

Cleaning agent preparations C and optionally A and/or B according to the invention also contain at least one glass corrosion inhibitor. Preparation(s) C and optionally preparation(s) A, preferably at least preparation(s) C, particularly preferably contain a corresponding amount of glass corrosion inhibitor(s). These glass corrosion inhibitors are preferably selected from water-soluble zinc salts, preferably zinc chloride, zinc sulfate and/or zinc acetate, particularly preferably zinc acetate, polyalkyleneimines, in particular polyethyleneimines.

In a preferred embodiment, the preparations according to the invention, in particular preparations A and/or C, contain at least one zinc salt, in particular inorganic or organic, as a glass corrosion inhibitor as a further component. The inorganic zinc salt is preferably selected from the group consisting of zinc bromide, zinc chloride, zinc iodide, zinc nitrate, and zinc sulfate. The organic zinc salt is preferably selected from the group consisting of zinc salts of monomeric or polymeric organic acids, particularly from the group of zinc acetate, zinc acetyl acetonate, zinc benzoate, zinc formiate, zinc lactate, zinc gluconate, zinc ricinoleate, zinc abietate, zinc valerate, and zinc-p-toluene sulfonate. In an embodiment that is particularly preferred according to the invention, zinc acetate is used as a zinc salt.

The zinc salt is preferably contained in cleaning agent preparations according to the invention in an amount of from 0.01 wt. % to 5 wt. %, particularly preferably in an amount of from 0.05 wt. % to 3 wt. %, in particular in an amount of from 0.1 wt. % to 2 wt. %, based on the total weight of the particular cleaning agent preparation, in particular the particular cleaning agent preparation A or C.

Polyethyleneimines such as those which are available under the name Lupasol® (BASF) are preferably used as glass corrosion inhibitors in an amount of 0 to 5 wt. %, in particular 0.01 to 2 wt. %, based on the total weight of the particular preparation.

Very particularly preferably, cleaning agent preparation C contains a zinc salt preferably in an amount of from 0.01 wt. % to 5 wt. %, particularly preferably in an amount of from 0.05 wt. % to 3 wt. %, in particular in an amount of from 0.1 wt. % to 2 wt. %, relative to the total weight of the cleaning agent preparation.

The cleaning agent preparation preferably contains a non-ionic surfactant. The use of a surfactant-containing cleaning agent preparation C can improve the rinsing performance achieved in the dishwashing processes according to the invention carried out using the products according to the invention. This applies in particular to preferred variants in which cleaning agent preparations A, B and C are dispensed in a time-staggered manner. The non-ionic surfactants described above are particularly suitable as surfactant additives for cleaning agent preparation C. Preferably, however, non-ionic surfactants of the general formula $R^1—CH(OH)CH_2O-(AO)_w-(A'O)_x-(A''O)_y-(A'''O)_z—R^2$, are used, in which

- $R^1$ represents a straight-chain or branched, saturated or mono- or polyunsaturated $C_6$-24 alkyl or alkenyl functional group;
- $R^2$ represents a linear or branched hydrocarbon functional group having 2 to 26 carbon atoms;
- A, A', A'' and A''' represent, independently of one another, a functional group from the group $—CH_2CH_2$, $—CH_2CH_2—CH_2$, $—CH_2—CH(CH_3)$, $—CH_2—CH_2—CH_2—CH_2$, $—CH_2—CH(CH_3)—CH_2—$, $—CH_2—CH(CH_2—CH_3)$;
- w, x, y and z represent values of between 0.5 and 120, where x, y and/or z can also be 0.

Here, the non-ionic surfactants of general formula $R^1—CH(OH) CH_2O-(AO)_w—R^2$ have proven to be particularly effective, in which

- $R^1$ represents a straight-chain or branched, saturated or mono- or polyunsaturated $C_6$-24 alkyl or alkenyl radical;
- $R^2$ represents a linear or branched hydrocarbon functional group having 2 to 26 carbon atoms;
- A represents a functional group from the group $CH_2CH_2$, $—CH_2CH_2—CH_2$, $—CH_2—CH(CH_3)$, and
- w represents values between 1 and 120, preferably 10 to 80, particularly 20 to 40.

The group of these non-ionic surfactants includes, for example, $C_4$-22 fatty alcohol-$(EO)_{10-80}$-2-hydroxyalkyl ethers, in particular also $C_{8-12}$ fatty alcohol-$(EO)_{22}$-2-hydroxydecyl ethers and $C_{4-22}$ fatty alcohol-(EO) 40-80-2-hydroxyalkyl ethers.

The proportion by weight of the non-ionic surfactant with respect to the total weight of cleaning agent preparation C is preferably from 1.0 to 20 wt. %, more preferably from 2.0 to 18 wt. %, particularly preferably from 4.0 to 15 wt. %, and in particular from 6.0 to 12 wt. %.

In a further particularly preferred embodiment, at least one cleaning agent preparation, in particular at least one cleaning agent preparation further comprising a non-ionic surfactant, particularly preferably at least cleaning agent preparation B and/or D, contains at least one hydrotropic substance (hereinafter also referred to as solubilizer). Preferred hydrotropic substances are xylene sulfonate, cumene sulfonate, urea and/or N-methylacetamide, particularly preferably cumene sulfonate and/or xylene sulfonate, in particular cumene sulfonate. It was found that the use of hydrotropic substances, in particular cumene sulfonate, enormously improves the phase stability with regard to temperature fluctuations. This can be observed in particular for preparations containing at least one non-ionic surfactant. Particularly preferably, at least cleaning agent preparation C, in particular cleaning agent preparations C and B, contains at least one hydrotropic substance, preferably xylene sulfonate, cumene sulfonate, urea and/or N-methylacetamide, particularly preferably cumene sulfonate and/or xylene sulfonate, in particular cumene sulfonate, preferably in an amount of from 2 to 25 wt. %, in particular from 4 to 20 wt. % and particularly preferably in an amount of from 6 to 15, for example from 7 to 12 wt. %, based on the total weight of the particular cleaning agent preparation.

The weight ratio of the at least one non-ionic surfactant with respect to the at least one hydrotropic substance, preferably xylene sulfonate, cumene sulfonate, urea and/or N-methylacetamide, particularly preferably cumene sulfonate and/or xylene sulfonate, in particular cumene sulfonate, is particularly preferably 2:1 to 1:2, in particular 1.6:1 to 1:1.

Cleaning agent preparation C preferably contains less than 1 wt. %, preferably less than 0.5 wt. %, in particular less than 0.1 wt. %, enzyme preparation and/or less than 2 mg active enzyme protein/g composition, preferably less than 1 mg active enzyme protein/g composition, in particular less than 0.5 mg active enzyme protein/g composition, particularly preferably cleaning agent preparation C contains less than 0.1 mg active enzyme protein/g composition. Cleaning agent preparation C very particularly preferably does not contain any enzyme preparation.

The composition of some exemplary cleaning agent product forms according to the invention, comprising cleaning agent preparations A, B and C, can be found in the following tables.

| | Formulation 1 [wt. %] | Formulation 2 [wt. %] | Formulation 3 [wt. %] | Formulation 4 [wt. %] | Formulation 5 [wt. %] |
|---|---|---|---|---|---|
| Ingredients Washing and cleaning preparation A | | | | | |
| Builder | 2 to 50 | 2 to 50 | 2 to 30 | 4 to 30 | 4 to 30 |
| MGDA | 2 to 60 | 8 to 30 | 10 to 20 | 12 to 15 | 0 |
| Phosphonates, if permitted by regulations | 0 to 10 | 1 to 8 | 1.2 to 6 | 1.5 to 4 | 1.5 to 4.5 |
| Surfactants | 2 to 40 | 4 to 40 | 5 to 35 | 5 to 35 | 5 to 35 |
| Misc. | to make up to 100 | to make up to 100 | to make up to 100 | to make up to 100 | to make up to 100 |

-continued

| | Formulation 1 [wt. %] | Formulation 2 [wt. %] | Formulation 3 [wt. %] | Formulation 4 [wt. %] | Formulation 5 [wt. %] |
|---|---|---|---|---|---|
| Ingredients Washing and cleaning preparation B | | | | | |
| Enzyme preparation, preferably protease and/or amylase preparation | at least 5 | at least 5 | at least 5 | at least 5 | at least 5 |
| Complexing agents | <2.5 | <2.5 | <2.5 | <2.5 | 0 |
| Misc. | to make up to 100 | to make up to 100 | to make up to 100 | to make up to 100 | to make up to 100 |
| Ingredients Washing and cleaning preparation C | | | | | |
| Surfactants, preferably non-ionic surfactants | 0-40 | 2.0-35 | 5.0-30 | 6.0-12.0 | 6.0-12.0 |
| Acid, preferably formic acid | 0.1-12 | 0.2-10 | 0.3-8.0 | 0.3-8.0 | 0.3-8.0 |
| Zinc salt | 0.01-5.0 | 0.05-3.0 | 0.05-3.0 | 0.1-2.0 | 0.1-2.0 |
| Hydrotropic substance, in particular cumene sulfonate | 2-25 | 4-20 | 6-15 | 6-15 | 6-15 |
| Enzyme preparation | <0.1 | <0.1 | <0.1 | <0.1 | — |
| Misc. | to make up to 100 | to make up to 100 | to make up to 100 | to make up to 100 | to make up to 100 |

The above-described combination of cleaning agents is packaged using a packaging material in which cleaning agent preparations A, B and C are separate from one another. This separation can be achieved, for example, by receiving chambers that are separate from one another, each of these receiving chambers containing one of the combined cleaning agents. Examples of such packaging forms are cartridges having two, three, four or more receiving chambers that are separate from one another, for example bottles having two, three, four or more chambers. Separating the cleaning agents of different compositions can prevent undesired reactions due to chemical incompatibility.

The viscosity of all cleaning agent preparations A, B and C is preferably less than 120 mPas, in particular from 1 to 100 mPas, in particular 10 to 80 mPas, preferably 20 to 60 mPas (measured at 20° C. with a Brookfield Instrument LVDV II+, spindle 31, 100 rpm). This has the advantage that the cleaning agent preparations can be dosed from the packaging material only by opening a valve on the underside of the packaging material (in particular of the cartridge) under gravity, preferably without the involvement of electrical or electronic means such as pumps, etc. At the same time, the chambers are preferably emptied largely completely, i.e. without large residual amounts of the cleaning agent preparations to be dosed. This is advantageous for the consumer and for the environment, because only small amounts of the cleaning agent preparations remain unused in the chambers of the packaging material or the cartridge.

In addition to preparations A, B and C, according to a particularly preferred embodiment the packaging means also contains at least one active ingredient composition, preferably separate from the cleaning agent preparations, in particular from cleaning agent preparations A, B and C, which composition preferably contains at least one carrier material, preferably a water-insoluble carrier material, and at least one active ingredient D. These are preferably fragrances and/or scent traps such as zinc ricinoleate, cyclodextrins, 2-menthyl-5-cyclohexylpentanol and 1-cyclohexylethanol, and/or dye, glass corrosion inhibitors, antimicrobial active ingredients, germicides or fungicides, and mixtures thereof.

In a particularly preferred embodiment of the present invention, the polymeric carrier material of the particles consists at least in portions of ethylene-vinyl acetate copolymer. A further preferred subject of the present application is therefore a cleaning agent product form as described above, characterized in that a polymeric carrier material contains at least 10 wt. %, preferably at least 30 wt. %, particularly preferably at least 70 wt. %, ethylene-vinyl acetate copolymer, and is preferably made entirely of ethylene-vinyl acetate copolymer.

Ethylene-vinyl acetate copolymers is the term for copolymers consisting of ethylene and vinyl acetate. In principle, this polymer is prepared in a process comparable to the preparation of low density polyethylene (LDPE). As the proportion of vinyl acetate increases, the crystallinity of the polyethylene is interrupted and in this way the melting and softening points and the hardness of the resulting products are reduced. The vinyl acetate also makes the copolymer more polar and thus improves its adhesion to polar substrates.

The ethylene-vinyl acetate copolymers described above are widely available commercially, for example under the trademark Elvax® (Dupont). In the context of the present invention, particularly suitable polyvinyl alcohols are, for example, Elvax® 265, Elvax® 240, Elvax® 205W, Elvax® 200W, and Elvax® 360. Products available under the trademark Evatane® (Arkema), for example, are also suitable.

In the context of the present invention, in particular in the field of fragrancing the interiors of automatic dishwashers, active ingredient compositions are particularly preferred in which ethylene-vinyl acetate copolymer is used as the polymeric carrier material and this copolymer contains 5 to 50 wt. % vinyl acetate, preferably 10 to 40 wt. % vinyl acetate and in particular 20 to 30 wt. % vinyl acetate, in each case based on the total weight of the copolymer. Further suitable carrier materials are the cyclodextrins.

Alternatively or in addition to the above-mentioned carrier materials, inorganic carrier materials are also preferably used. Cleaning agent product forms are particularly preferred, characterized in that at least one of the carrier materials is an inorganic carrier material, preferably a silicate, phosphate or borate.

The silicates, phosphates or borates are preferably in the form of a glass, particularly preferably in the form of a water-soluble glass. Particularly preferred glasses are glasses containing zinc and/or bismuth, in particular glasses containing bismuth phosphate and/or zinc phosphate. In such a case, the carrier material is water-soluble and its substance already contains the active ingredient directly, in particular the glass corrosion inhibitors zinc and/or bismuth, in the carrier material.

In a preferred embodiment, the cleaning agent product forms can contain such glasses containing zinc or bismuth, particularly preferably glass containing zinc phosphate, in addition to a further active ingredient composition comprising a carrier material, preferably a water-insoluble carrier material and at least one active ingredient D. These can then be contained in a common chamber or in separate chambers, in particular in one or more chambers, which have openings, in particular openings such that the rinsing liquor and/or air can flow through them. Cleaning agent product forms are preferred which contain a zinc phosphate-containing or bismuth phosphate-containing glass and further contain at least one, preferably two, three or more active ingredient compositions which comprise one or more fragrances and/or one or more scent traps as active ingredients.

In the context of the present application, thermoplastic carrier materials or carrier materials which deform plastically under the action of the ambient temperatures occurring during use are particularly preferred. The plastic deformation of the carrier materials in the course of one or more applications results in a change in the carrier material surface, in particular a change in the size of the carrier material surface, which in turn has an advantageous effect on the release profile and the release kinetics of the cleaning-active ingredients contained in the active ingredient compositions. Dosing devices that are characterized in that at least one polymeric carrier material has a melting or softening point between 4° and 125° C., preferably between 6° and 100° C., particularly preferably a melting point of 70 to 90° C. and in particular between 73 and 80° C. (preferred method of determination for the melting point according to ISO 11357-3), are preferred according to the invention.

The cleaning agent product forms according to the invention are suitable in particular for multiple dosing of the active ingredient comprised therein. In order to ensure such multiple dosing over a large number of cleaning processes, it has proven advantageous to use exclusively water-insoluble carrier materials. These water-insoluble carrier materials also simplify the production of product forms according to the invention. Preferred product forms are therefore characterized in that all the carrier materials used are water-insoluble.

In principle, the active ingredient compositions can assume all states of matter and/or spatial shapes that can be realized depending on the chemical and physical properties of the carrier materials. In a further embodiment, at least one of the active ingredient compositions is in the form of a gel.

In a further embodiment, at least one of the active ingredient compositions is in the form of a solid. Active ingredient compositions are particularly preferably used in the form of individual blocks comprising an entire active ingredient composition.

The active ingredient compositions can preferably be in particulate form, the active ingredient compositions in which the carrier material of at least one of the active ingredient compositions is in particle form being particularly preferred, these particles preferably having an average diameter of from 0.5 to 20 mm, preferably from 1 to 10 mm and in particular from 3 to 6 mm.

Active ingredient compositions are particularly preferably used which comprise at least one colored active ingredient composition. By coloring at least one of the active ingredient compositions, a visual differentiation of these compositions can be achieved and the multiple uses of these different compositions can be shown in a simple manner. Furthermore, however, the dyes are also suitable as indicators, in particular as consumption indicators for the colored active ingredient compositions.

Preferred dyes, which can be selected by the person skilled in the art without difficulty, should be highly stable in storage, unaffected by the other ingredients of the agent and light, and should not exhibit pronounced substantivity with respect to the substrates to be treated with the dye-containing agents, such as glass, ceramic, or plastics dishware, in order to avoid dyeing said fibers.

When selecting the colorant, it must be ensured that the colorant is highly stable in storage, is insensitive to light and does not have an excessive affinity for glass, ceramics or plastics dishware. At the same time, when choosing suitable colorants, it must be taken into account that colorants have different stabilities against oxidation. In general, water-insoluble colorants are more stable against oxidation than water-soluble colorants. The concentration of the colorant in the cleaning agents varies depending on the solubility and thus also on the sensitivity to oxidation. In the case of highly water-soluble colorants, colorant concentrations in the range of from a few 10-2 to 10-3 wt. % are typically selected. In contrast, in the case of the pigment dyes, which are particularly preferred because of their brightness, but which are less water-soluble, the suitable concentration of the colorant in cleaning agents is typically a few 10-3 to 10-+wt. %.

According to a preferred embodiment, the cleaning agent product form is characterized in that the at least one active ingredient D is selected from the group of fragrances, preferably linalyl acetate, dihydromyrcenol, citronellonitrile, menthyl acetate, methylphenylbutanol, eucalyptol, and mixtures thereof, scent traps such as zinc ricinoleate, cyclodextrins, 2-menthyl-5-cyclohexylpentanol and 1-cyclohexylethanol, in particular zinc ricinoleate; dye, glass corrosion inhibitors, antimicrobial active ingredients, germicides or fungicides, and mixtures thereof, preferably mixtures of at least one scent trap, preferably with one, two, three or more scents and/or at least one dye. Mixtures of at least one fragrance, preferably two, three or more fragrances, and at least one dye are also preferred.

Individual odorant compounds, such as the synthetic products of the ester, ether, aldehyde, ketone, alcohol, and hydrocarbon types, can be used as perfume oils or fragrances within the scope of the present invention. However, mixtures of different odorants are preferably used which together produce an appealing fragrance note. Perfume oils of this kind can also contain natural odorant mixtures, as are obtainable from plant sources, e.g. pine, citrus, jasmine, patchouli, rose or ylang-ylang oil.

If it is to be perceptible, an odorant must be volatile, wherein, in addition to the nature of the functional groups and the structure of the chemical compound, the molar mass also plays an important role. Therefore, most odorants have molar masses of up to approximately 200 daltons, whereas molar masses of 300 daltons and above represent something of an exception. Due to the differing volatility of odorants, the odor of a perfume or fragrance composed of multiple odorants varies over the course of vaporization, wherein the odor impressions are divided into "top note," "middle note or body" and "end note or dry out." Because the perception of an odor also depends to a large extent on the odor intensity, the top note of a perfume or fragrance is not made up only of highly volatile compounds, whereas the end note comprises for the most part less volatile, i.e. adherent odorants. In the composition of perfumes, more volatile odorants can be bound, for example, to specific fixatives, which prevents them from evaporating too quickly. The division of odorants into "more volatile" and "adherent" odorants below thus provides no information about the impression of the odor and whether the corresponding odorant is perceived as a top note or middle note.

The fragrances can be processed directly, but it may also be advantageous to apply the fragrances to carriers, which ensure long-lasting fragrance due to slower fragrance release. Cyclodextrins, for example, have proven suitable as such carrier materials, it being possible for the cyclodextrin-perfume complexes to be coated with further auxiliaries.

According to the invention, particularly preferred fragrances are linalyl acetate, dihydromyrcenol, citronellonitrile, menthyl acetate, methylphenylbutanol and/or eucalyptol, and mixtures thereof.

The known ricenolates, in particular zinc ricenoleates, can be used, for example, as scent traps (or, as also used synonymously below, odor neutralizers or fragrance neutralizers, agents against malodor or bad odors). 2-Menthyl-5-cyclohexylpentanol and 1-cyclohexylethanol are also preferred as scent traps. Activated carbon and/or cyclodextrins and/or zeolites, preferably acid-modified zeolites, can also be used with particular preference. Zinc ricinoleate alone or in combination with one or more of the above-mentioned fragrances and/or scent traps is particularly preferred, since it also has a positive effect on inhibiting glass corrosion during the rinsing process.

In order to combat microorganisms, antimicrobial active ingredients can be used as an alternative or in addition to the above-mentioned fragrances and/or scent traps. Here, depending on the antimicrobial spectrum and mechanism of action, a distinction is made between bacteriostatics and bactericides, fungistats and fungicides, etc. Important substances from these groups are, for example, benzalkonium chlorides, alkylarlylsulfonates, halophenols and phenolmercuric acetate, although these compounds can be dispensed with entirely.

In principle, the active ingredients can be contained in the active ingredient preparations in any desired amounts. However, dosing devices are particularly preferred in which the proportion by weight of the active ingredients is 1 to 70 wt. %, more preferably 10 to 60 wt. %, particularly preferably 20 to 50 wt. %, in particular 30 to 40 wt. %, in each case based on the total weight of the active ingredient composition(s).

If more than one active ingredient composition is present in the cleaning agent product form, these can be present in the packaging means of the cleaning agent product form separately from one another or next to one another. The different active ingredient compositions can preferably be present in the packaging means of the cleaning agent product form next to one another, i.e. in direct contact with one another.

It is particularly advantageous if an active ingredient composition D, in particular comprising fragrances and/or scent traps, and simultaneously formic acid as an acidifying agent are used in preparation C. Formic acid itself has a slightly pungent odor that is unpleasant for sensitive consumers. Due to the separate storage of the active ingredient composition and the release of the at least one active ingredient D, in particular if it is one or more fragrances, in particular those preferred above, and/or one or more scent traps, in particular zinc ricinoleate, for example, there is no unpleasant odor inside the dishwasher either during the dishwashing process or in the time between the cleaning cycles.

The present application also relates to a cleaning agent product form, comprising a) a cleaning agent preparation A according to the invention in a sufficient amount to carry out an automatic dishwashing process at least twice, preferably at least four times and in particular at least eight times;
b) at least one further cleaning agent preparation B, which is different from A, in a sufficient amount to carry out an automatic dishwashing process at least twice, preferably at least four times and in particular at least eight times;
c) a further cleaning agent preparation C, which is different from A and B, in a sufficient amount to carry out an automatic dishwashing process at least twice, preferably at least four times and in particular at least eight times;
d) optionally at least one further active ingredient composition, which is different from A, B and C, in a sufficient amount to carry out an automatic dishwashing process at least twice, preferably at least four times and in particular at least eight times, which composition contains at least one carrier material, preferably a water-insoluble carrier material, and at least one active ingredient D;
e) a cartridge for cleaning agent preparations A, B and C or A, B, C and D, in which cleaning agent preparations A, B, C or A, B, C and D are in separate receiving chambers.

The present application also relates to comprising a cleaning agent dosing system, comprising a) a cleaning agent preparation A according to the invention in a sufficient amount to carry out an automatic dishwashing process at least twice, preferably at least four times and in particular at least eight times;
b) at least one further cleaning agent preparation B, which is different from A, in a sufficient amount to carry out an automatic dishwashing process at least twice, preferably at least four times and in particular at least eight times;
c) a further cleaning agent preparation C, which is different from A and B, in a sufficient amount to carry out an automatic dishwashing process at least twice, preferably at least four times and in particular at least eight times;
d) optionally at least one further active ingredient composition, which is different from A, B and C, in a sufficient amount to carry out an automatic dishwashing process at least twice, preferably at least four times and in particular at least eight times, which composition contains at least one carrier material, preferably a water-insoluble carrier material, and at least one active ingredient D;
e) a cartridge for cleaning agent preparations A, B and C or A, B, C and D, in which cleaning agent preparations A, B, C or A, B, C and D are in separate receiving chambers;
f) a dosing device detachably connected to the cartridge.

In a preferred embodiment, the above-described cartridges of the cleaning agent product forms are provided with a dosing device that can be detached from the cartridge. Such a dosing device can be connected to the cartridge for example by means of an adhesive, locking, snap or plug-in connection. Separating the cartridge and the dosing device simplifies the filling of the cartridge, for example. Alternatively, the detachable connection of the cartridge and the dosing device allows the cartridges on the dosing device to be exchanged. Such an exchange can be indicated, for example, when the cleaning program is changed or after the cartridge has been completely emptied.

This application particularly preferably relates to a cleaning agent dosing system, comprising a) a cleaning agent product form according to the invention, comprising a sufficient amount of cleaning agent preparations A, B and C or A, B, C and D for carrying out an automatic dishwashing process at least twice, preferably at least four times, and in particular at least eight times;

b) a dosing device detachably connected to the cleaning agent product form.

Of course, cleaning agent product forms are also conceivable in which the cartridge and the dosing device are non-detachably connected to one another.

The present application also relates to comprising a cleaning agent dosing system, comprising a) a cleaning agent product form according to the invention, comprising a sufficient amount of cleaning agent preparations A, B and C or A, B, C and D for carrying out an automatic dishwashing process at least twice, preferably at least four times, and in particular at least eight times;

b) a dosing device non-detachably connected to the cleaning agent product form.

In a preferred embodiment, the above-mentioned cleaning agent dosing systems, comprising the cleaning agent product form according to the invention (and optionally one or two further compositions which are different from cleaning agent preparations A, B and C or A, B, C and D according to the invention), a cartridge and a dosing device detachably connected to the cartridge, are provided in a common outer packaging, the filled cartridge and the dosing device being contained in the outer packaging particularly preferably separately from one another. The outer packaging is used for storage, transport and presentation of the cleaning agent product form according to the invention and protects it from contamination, impact and shock. In particular for the purpose of presentation, the outer packaging should be at least partially transparent.

As an alternative or in addition to an outer packaging, there is of course the possibility of marketing the cleaning agent product form according to the invention in connection with a dishwasher. Such a combination is particularly advantageous in cases in which the course of the automatic dishwashing process (e.g. duration, temperature curve, water supply) and the cleaning agent formulation or the control electronics of the dosing device are coordinated with one another.

The dosing system according to the invention consists of the basic components of a cartridge filled with the cleaning agent according to the invention and a dosing device that can be coupled to the cartridge, which device in turn is formed from further assemblies, such as component carriers, actuators, closing elements, sensors, energy sources and/or control units.

It is preferable for the dosing system according to the invention to be movable. In the context of this application, “movable” means that the dosing system is not non-detachably connected to a water-conveying device such as a dishwasher or the like, but can be removed by the user from a dishwasher or positioned in a dishwasher, i.e. can be handled independently.

According to an alternative embodiment of the invention, it is also conceivable that the dosing device is connected to a water-conveying device such as a dishwasher or the like so that the user cannot detach it, and only the cartridge is movable.

Since the preparations to be dosed can have a pH between 2 and 14, in particular 2 and 12, depending on the intended use, all components of the dosing system that come into contact with the preparations should have a corresponding acid and/or alkali resistance. Furthermore, through a suitable selection of materials, these components should be largely chemically inert, for example against non-ionic surfactants, enzymes and/or fragrances.

Within the meaning of the application, a cartridge is understood to mean a package which is suitable for surrounding or holding together flowable or dispersible preparations and which can be coupled to a dosing device to dispense the preparation. In particular, a cartridge can also comprise several chambers which can be filled with compositions that are different from one another. It is also conceivable for a plurality of containers to be arranged to form a cartridge unit.

It is advantageous for the cartridge to comprise at least one outlet opening, which is arranged such that the preparation can be released from the container under gravity in the use position of the dosing device. As a result, no further conveying means for releasing the preparation from the container are required, and therefore the design of the dosing device can be kept simple and the production costs can be kept low.

In a preferred embodiment of the invention, at least one second chamber for holding at least one second flowable or dispersible preparation is provided, the second chamber comprising at least one outlet opening, which is arranged such that the preparation is released from the second chamber under gravity in the use position of the dosing device. The arrangement of a second chamber is in particular advantageous when preparations that are not usually storage-stable in combination are stored in the separate containers, such as bleaching agents and enzymes.

Furthermore, according to the invention it is necessary for more than two, in particular three, four or five chambers to be provided in or on a cartridge. In particular, at least one of the chambers for dispensing active ingredients D, such as a glass corrosion inhibitor, a fragrance or in particular an odor neutralizer, to the environment is designed such that it has openings through which the rinsing liquor and/or air can flow.

In a further embodiment of the invention, the cartridge is formed in one piece. As a result, the cartridges can be formed cost-effectively in one production step, in particular by suitable blow-molding methods. In this case, the chambers of a cartridge can be separated from one another, for example by partitions or material bridges.

The cartridge can also be formed in multiple pieces by components produced in injection molding and then joined together. Furthermore, it is conceivable that the cartridge is formed in multiple pieces such that at least one chamber, preferably all chambers, can be removed from the dosing device or inserted into the dosing device individually. As a result, in the event of an unequally heavy consumption of a preparation from one chamber, it is possible to exchange an already emptied chamber while the other chambers, which can still be filled with preparation, remain in the dosing device. This can achieve a targeted and needs-based refilling of the individual chambers or their preparations.

The chambers of a cartridge can be fixed to one another by suitable connecting methods, such that a container unit is formed. The chambers can be fixed so as to be detachable or non-detachable from one another by a suitable form-fitting, frictional or integral connection.

In particular, the fixing can be carried out by one or more methods of connection from the group of snap-in connections, Velcro fastenings, press fits, fused joints, adhesive connections, welded connections, soldered connections, screw connections, keyed joints, clamping connections or snap connections. In particular, the fixing can also be formed by a heat shrink tube (so-called sleeve) which is pulled over the whole cartridge or portions of the cartridge in a heated state and tightly surrounds the chambers or the cartridge in the cooled state.

In order to provide the chambers with advantageous residual emptying properties, the bottom of the chambers can be inclined in a funnel shape towards the dispensing opening. Furthermore, the inner wall of a chamber can, by suitable choice of material and/or surface design, be designed such that the preparation has little material adhesion to the inner chamber wall. This measure can also further optimize the residual emptying of a chamber.

The chambers of a cartridge may have filling volumes which are the same or different. In a configuration with two chambers, the ratio of the container volumes is preferably 5:1; in a configuration with three chambers it is preferably 4:1:1, these configurations being particularly suitable for use in dishwashers.

As mentioned above, the cartridge preferably has 3, 4, 5 or 6 chambers. For the use of such a cartridge in a dishwasher, it is particularly preferred that the first chamber contains an alkaline cleaning preparation, the second chamber contains an enzymatic preparation and the third chamber contains a clear rinser, the volume ratio of the compartments being approximately 4:1:1. The fourth chamber contains the at least one active ingredient composition, comprising the at least one active ingredient D and a carrier material, preferably a water-insoluble carrier material.

A dosing chamber can be formed in or on a chamber, upstream of the outlet opening in the flow direction of the preparation. The amount of preparation which is intended to be dispensed from the chamber into the environment upon release of the preparation is established by the dosing chamber. This is advantageous in particular if the closing element of the dosing device, which causes the dispensing of the preparation from a chamber into the environment, can only be put into a dispensing and closure state without monitoring the amount being dispensed. The dosing chamber thus ensures that a predefined amount of preparation is released without immediate feedback of the dispensed amount of preparation. The dosing chambers can be formed in one piece or multiple pieces.

According to a further advantageous development of the invention, one or more chambers each comprise, in addition to an outlet opening, a liquid-tight sealable chamber opening. This chamber opening makes it possible, for example, to refill preparation stored in this chamber.

In order to ventilate the cartridge chambers, ventilation options can be provided, in particular in the top region of the cartridge, in order to ensure pressure equalization between the interior of the cartridge chambers and the environment when the filling level of the chambers falls. These ventilation options can be designed, for example, as a valve, in particular a silicone valve, micro-openings in the cartridge wall, or the like.

If, according to a further embodiment, the cartridge chambers are not ventilated directly, but rather via the dosing device, or there is no ventilation, e.g. when using flexible containers, such as pouches, this has the advantage that at increased temperatures in the course of a dishwasher rinsing cycle, the heating of the chamber contents causes pressure to build, which pushes the preparations to be dosed in the direction of the outlet openings, so that the cartridge can be easily emptied. Furthermore, such air-free packaging does not present the risk of oxidation of substances in the preparation, which makes pouch packaging or bag-in-bottle packaging seem appropriate in particular for preparations sensitive to oxidation.

The cartridge usually has a filling volume of <5000 mL, in particular <1000 mL, preferably <500 mL, particularly preferably <250 mL, very particularly preferably <50 mL.

The cartridge can take on any spatial shape. For example, it can be in the form of a cube, a sphere, or a plate.

The cartridge and the dosing device can in particular be designed in terms of their spatial shape such that they ensure the lowest possible loss of usable volume, in particular in a dishwasher.

In order to use the dosing device in dishwashers, it is particularly advantageous for the device to be shaped in accordance with dishes to be cleaned in dishwashers. For example, said device can be planar, with approximately the same dimensions as a plate. This allows the dosing device to be positioned in a space-saving manner, for example in the lower rack of the dishwasher. Furthermore, the correct positioning of the dosing unit is immediately and intuitively revealed to the user due to its plate-like shape. The cartridge preferably has a height:width:depth ratio of between 5:5:1 and 50:50:1, particularly preferably approximately 10:10:1. The "slim" design of the dosing device and the cartridge makes it possible in particular to position the device in the lower cutlery basket of a dishwasher in the receptacles provided for plates. This has the advantage that the preparations dispensed from the dosing device reach the rinsing liquor directly and cannot adhere to other items to be washed.

Commercially available domestic dishwashers are usually designed such that larger items to be washed, such as pans or large plates, are arranged in the lower rack of the dishwasher. In order to avoid non-optimal positioning of the dosing system by the user in the upper rack, in an advantageous embodiment of the invention the dosing system is dimensioned such that the dosing system can be positioned only in the receptacles provided in the lower rack. For this purpose, the width and the height of the dosing system can be selected to be in particular between 150 mm and 300 mm, particularly preferably between 175 mm and 250 mm.

However, it is also conceivable to design the dosing unit in the form of a cup having a substantially circular or square base.

In order to protect heat-sensitive components of a preparation located in a cartridge from the effects of heat, it is advantageous to produce the cartridge from a material having low thermal conductivity.

Another possibility for reducing the influence of heat on a preparation in a chamber of the cartridge is to insulate the chamber by suitable measures, for example by using thermal insulation materials such as styrofoam, which completely or partially enclose the chamber or the cartridge in a suitable manner.

In a preferred embodiment of the invention, the cartridge comprises an RFID marker which contains at least information about the contents of the cartridge and which can be read out by the sensor unit.

This information can be used to select a dosing program stored in the control unit. This can ensure that a dosing program is always used which is optimal for a specific preparation. It may also be the case that in the absence of an RFID label or if there is an RFID label with an incorrect or inaccurate identifier, no dosing is carried out by the dosing device, and instead a visual or acoustic signal is produced which informs the user of the error.

In order to prevent incorrect use of the cartridge, the cartridges can also comprise structural elements which interact with corresponding elements of the dosing device according to the key/lock principle, such that, for example, only cartridges of a specific type can be coupled to the dosing device. This design also makes it possible for information about the cartridge coupled to the dosing device to be transferred to the control unit, which allows the dosing device to be controlled according to the contents of the corresponding container.

The cartridge is in particular designed for holding flowable cleaning agents. Such a cartridge particularly preferably has a plurality of chambers for the spatially separated holding of preparations of a cleaning agent that are different from one another. The cartridge can be designed such that it can be arranged detachably or in a fixed manner in or on the dishwasher.

The control unit, sensor unit and at least one actuator required for operation are integrated in the dosing device. An energy source is preferably also arranged in the dosing device.

The dosing device preferably consists of a splash-proof housing that prevents splashing water from penetrating into the interior of the dosing device, as can occur, for example, when used in a dishwasher.

It is particularly preferred that the dosing device comprises at least one first interface which interacts with a corresponding interface formed in or on a water-conveying device, in particular a water-conveying domestic appliance, preferably a dishwasher, such that there is a transfer of electrical energy from the water-conveying device to the dosing device.

In an embodiment of the invention, the interfaces are formed by plug-in connectors. In a further embodiment, the interfaces can be designed such that electrical energy is transferred wirelessly.

In an advantageous development of the invention, a second interface is formed on each of the dosing device and the water-conveying device, such as a dishwasher, for the transmission of electromagnetic signals, which in particular represent information regarding the operating state, measurement and/or control of the dosing device and/or the water-conveying device such as a dishwasher.

An adapter can be used to easily couple the dosing system to a water-conveying domestic appliance. The adapter is used to mechanically and/or electrically connect the dosing system to the water-conveying domestic appliance.

The adapter is preferably rigidly connected to a water-conveying line of the domestic appliance. However, it is also conceivable to provide the adapter for positioning in or on the domestic appliance, where the adapter is caught by the water flow and/or spray of the domestic appliance.

The adapter makes it possible to implement a dosing system for both a stand-alone version and a "build-in" version. It is also possible to design the adapter as a type of charging station for the dosing system, in which, for example, the energy source of the dosing device is charged or data is exchanged between the dosing device and the adapter.

The adapter can be arranged in a dishwasher on one of the inner walls of a washing chamber, in particular on the inner face of a dishwasher door. However, it is also conceivable that the adapter as such is positioned in the water-conveying domestic appliance so as to be inaccessible to the user, so that the dosing device is inserted into the adapter, for example, during assembly of the domestic appliance, with the adapter, the dosing device and the domestic appliance being designed such that a cartridge can be coupled to the dosing device by the user.

The cleaning agent product forms according to the invention are suitable for use in dishwashing, although the use of a cleaning agent product form according to the invention or a cleaning agent dosing system for washing dishes in an automatic dishwashing process is preferred.

As stated at the outset, the cleaning agents according to the invention are distinguished by a particular physical and chemical stability, in particular to temperature fluctuations. The cleaning agents according to the invention are therefore exceptionally suitable for dosing by means of a dosing system located in the interior of a dishwasher. A dosing system of this type, which can be immovably integrated into the interior of the dishwasher (machine-integrated dosing device), but of course can also be introduced into the interior as a movable device (self-sufficient dosing device), contains many times the amount of cleaning agent needed to carry out an automatic cleaning process.

In the context of this application, "movable" means that the dispensing and dosing system is not non-detachably connected to a device such as a dishwasher or the like, but can be removed from a dishwasher or positioned in a dishwasher.

The present application also relates to the use of a cleaning agent product form according to the invention for filling i) a cartridge of a dosing system integrated immovably in the interior of a dishwasher, or ii) a movable cartridge of a dosing system provided for positioning in the interior of a dishwasher with a sufficient amount of said cleaning agent product form to carry out an automatic dishwashing process at least twice, preferably at least four times and in particular at least eight times.

An example of an immovable cartridge is a container that is immovably integrated into the interior, for example into the side wall or the inner lining of the door of a dishwasher. An example of a movable cartridge is a container that is brought into the interior of the dishwasher by the consumer and remains there during the entire course of a cleaning cycle. Such a cartridge can be integrated into the interior, for example by simply being placed in the cutlery basket or dish rack, but can also be removed again from the interior of the dishwasher by the consumer.

The cleaning agent or cleaning agent combination is dosed from the cartridge into the interior of the dishwasher, as described above, preferably by means of a dosing device that can be detached from the cartridge. Such a dosing device can be connected to the cartridge by means of an adhesive, locking, snap or plug-in connection. However, cartridges having a non-detachably connected dosing device can of course also be used.

The use of a cleaning agent product form according to the invention as a cleaning agent reservoir for i) a dosing device integrated immovably in the interior of a dishwasher or ii) a movable dosing device intended to be positioned in the interior of a dishwasher is preferred.

The present application also relates to the use of a cleaning agent dosing system according to the invention as a cleaning agent reservoir for a dishwasher.

Two further subjects of this application are the use of a cleaning agent product form according to the invention, comprising a) a cleaning agent preparation A according to the invention in a sufficient amount to carry out an automatic dishwashing process at least twice, preferably at least four times and in particular at least eight times;

b) at least one further cleaning agent preparation B, which is different from A, in a sufficient amount to carry out an automatic dishwashing process at least twice, preferably at least four times and in particular at least eight times;

c) a further cleaning agent preparation C, which is different from A and B, in a sufficient amount to carry out an automatic dishwashing process at least twice, preferably at least four times and in particular at least eight times;

d) optionally at least one further active ingredient composition, which is different from A, B and C, in a sufficient amount to carry out an automatic dishwashing process at least twice, preferably at least four times and in particular at least eight times, which composition contains at least one carrier material, preferably water-insoluble carrier material, and at least one active ingredient D;

e) a cartridge for cleaning agent preparations A, B and C or A, B, C and D, in which cleaning agent preparations A, B, C or A, B, C and D are in separate receiving chambers as a cleaning agent reservoir for i) a dosing device integrated immovably in the interior of a dishwasher, or ii) a movable dosing device intended to be positioned in the interior of a dishwasher.

The cleaning agents and cleaning agent combinations according to the invention are, as stated above, preferably used as automatic dishwasher detergents.

An automatic dishwashing process using a cleaning agent product form or a cleaning agent dosing system according to the invention, in the course of which, from a cartridge located in the interior of the dishwasher, a partial amount a of cleaning agent preparation A located in the cartridge is dosed into the interior of the dishwasher, a residual amount of the cleaning agent preparation located in the cartridge remaining in the cartridge until the end of the dishwashing process, characterized in that this residual amount corresponds to at least twice, preferably at least four times, and in particular at least eight times, the partial amount a; and a partial amount b of cleaning agent preparation B located in the cartridge is dosed into the interior of the dishwasher, a residual amount of the cleaning agent preparation located in the cartridge remaining in the cartridge until the end of the dishwashing process, characterized in that this residual amount corresponds to at least twice, preferably at least four times, and in particular at least eight times, the partial amount b; and a partial amount c of cleaning agent preparation C located in the cartridge is dosed into the interior of the dishwasher, a residual amount of the cleaning agent preparation located in the cartridge remaining in the cartridge until the end of the dishwashing process, characterized in that this residual amount corresponds to at least twice, preferably at least four times, and in particular at least eight times, the partial amount c.

optionally a partial amount d of active ingredients D optionally located in the cartridge is dosed into the interior of the dishwasher, a residual amount of the active ingredient located in the cartridge remaining in the cartridge until the end of the dishwashing process, characterized in that this residual amount corresponds to at least twice, preferably at least four times, and in particular at least eight times, the partial amount d, and According to a preferred embodiment, the invention also relates to an automatic dishwashing process in which the active ingredient composition is located in the cartridge and the rinsing liquor and/or air flows through the composition via openings. When air flows through the composition, fragrance(s) are in particular released into the air in the interior of the dishwasher and, in addition to fragrancing the rinsing liquor during the dishwashing process, this also leads to a pleasant odor for the consumer when opening and loading the dishwasher between the individual rinse cycles.

In the dishwashing process according to the invention, it is of course possible to use not only the cleaning agent product forms according to the invention but also the cleaning agent dosing systems according to the invention.

In a preferred embodiment, cleaning agent preparation A and cleaning agent preparation B as well as cleaning agent preparation C are dosed at different times in the cleaning cycle.

Another preferred subject of this application is therefore an automatic dishwashing process using a cleaning agent product form according to the invention or a cleaning agent dosing system according to the invention, in the course of which a) at a time t1, from a cartridge located in the interior of the dishwasher, a partial amount a of cleaning agent preparation A according to the invention located in the cartridge is dosed into the interior of the dishwasher, a residual amount of the cleaning agent located in the cartridge remaining in the cartridge until the end of the dishwashing process, which residual amount corresponds to at least twice, preferably at least four times, and in particular at least eight times, the partial amount a;

b) at at least one additional time t2≠t1, from a cartridge located in the interior of the dishwasher, a partial amount b of cleaning agent preparation B located in the second cartridge and different from cleaning agent preparation A according to the invention is dosed into the interior of the dishwasher, a residual amount of the cleaning agent located in this cartridge remaining in the cartridge until the end of the dishwashing process, which residual amount corresponds to at least twice, preferably at least four times, and in particular at least eight times, the partial amount b;

c) at at least one additional time t3/t2 #t1, from a cartridge located in the interior of the dishwasher, a partial amount d of cleaning agent preparation C located in a further cartridge and different from cleaning agent preparations A and B according to the invention is dosed into the interior of the dishwasher, a residual amount of the cleaning agent located in this cartridge remaining in the cartridge until the end of the dishwashing process, which residual amount corresponds to at least twice, preferably at least four times, and in particular at least eight times, the partial amount d.

In preferred embodiments of the automatic dishwashing process described above with time-staggered dosing of cleaning agent preparations A, B and C, the time t2 is at least 1 minute, preferably at least 2 minutes and in particular between 3 and 30 minutes, in particular between 3 and 20 minutes, before or after, preferably before, the time t1. In preferred embodiments of the automatic dishwashing process described above with time-staggered dosing of the minute, preferably at least 2 minutes and in particular between 3 and 30 minutes, in particular between 3 and 20 minutes, before or after, preferably after, the time t1.

In a preferred embodiment, cleaning preparation B is dosed into the interior at a temperature of 20-35° C., then cleaning preparation A is dosed at a temperature of 30-60° C. and then cleaning preparation C is dosed at a temperature below 20° C.

What is claimed is:

1. A cleaning agent product form, comprising a) a liquid (20° C.) cleaning agent preparation A, containing:

a1) a builder;

a2) complexing agents;

b) a liquid (20° C.) cleaning agent preparation B that is different from cleaning agent preparation A, having a water content above 1 wt. %, containing:

b1) at least 5 wt. % of at least one cleaning-active enzyme preparation;

c) a liquid (20° C.) cleaning agent preparation C, containing:

c1) an acidifying agent;

c2) a glass corrosion inhibitor;

c3) optionally a hydrotropic substance;

c4) optionally a non-ionic surfactant;

c5) optionally less than 1 wt. % enzyme preparation; and d) at least one active ingredient preparation D comprising:

d1) at least one fragrance and/or scent trap;

d2) a water insoluble carrier material comprising at least 10% ethylenevinyl acetate copolymer, based on the weight of the carrier material; and e) a cartridge for preparations A, B, C and D, in which preparations A, B, C and D are each in separate receiving chambers, wherein preparations A, B, C and D are dispensed from the cartridge in a time-staggered manner.

2. The cleaning agent product form according to claim 1, wherein cleaning agent preparation C contains the acidifying agent c1) selected from formic acid, tartaric acid, succinic acid, malonic acid, adipic acid, maleic acid, fumaric acid, acetic acid, citric acid, oxalic acid and/or polyacrylic acid, and/or cleaning agent preparation C contains acidifying agent c1) in amounts of 0.1 to 12 wt. % in each case based on the total weight of cleaning agent preparation C.

3. The cleaning agent product form according to claim 1, wherein cleaning agent preparation C the glass corrosion inhibitor c2) is selected from polyalkyleneimines and/or water-soluble zinc salts, and/or cleaning agent preparation C contains the glass corrosion inhibitor c2) in amounts of 0.01 wt. % to 5 wt. %, based on the total weight of cleaning agent preparation C.

4. The cleaning agent product form according to claim 1, wherein cleaning agent preparation C the hydrotropic substance c3) is selected from xylene sulfonate, cumene sulfonate, urea and/or N-methylacetamide, and/or the cleaning agent preparation C contains the hydrotropic substance c3) in an amount from 2 to 25 wt. %, based on the total weight of cleaning preparation C.

5. The cleaning agent product form according to claim 1, wherein cleaning agent preparation A contains, based on its total weight, 2 to 50 wt. % builder and/or the builder a1) is selected from the group consisting of carbonates, hydrogen carbonates, citrates, silicates, polymeric carboxylates and sulfonic acid group-containing polymers.

6. The cleaning agent product form according to claim 1, wherein the complexing agent a2) is selected from the group consisting of hydroxyethyl-ethylenediaminetriacetic acid, ethylenediaminetetraacetic acid, diethylenetriaminepentaacetic acid, glutamic acid diacetic acid and the salts and mixtures thereof, and/or cleaning agent preparation A contains 2 to 60 wt. % complexing agents.

7. The cleaning agent product form according to claim 1, wherein cleaning agent preparation B contains a cleaning-active enzyme selected from the group consisting of amylases, proteases, cellulases, hemicellulases, lipases, and mixtures thereof.

8. The cleaning agent product form according to claim 1, wherein cleaning agent preparation B contains, based on its total weight, 30 wt. % or less, water and/or cleaning agent preparation B contains organic solvent.

9. The cleaning agent product form according to claim 1, wherein cleaning agent preparation B and/or C contains surfactants in each case in an amount of 5 to 35 wt. % based on the total weight of the particular preparation.

10. A cleaning agent dosing system, comprising a) a cleaning agent product form according to claim 1, comprising a sufficient amount of cleaning agent preparations A, B, C, and D for carrying out an automatic dishwashing process at least twice;

b) a dosing device detachably connected to the cleaning agent product form.

11. A cleaning agent dosing system according to claim 10, for dishwashing in an automatic dishwashing process.

12. An automatic dishwashing process using a cleaning agent product form according to claim 1, in the course of which, from a cartridge located in the interior of the dishwasher, wherein a partial amount a of cleaning agent preparation A located in the cartridge is dosed into the interior of the dishwasher, a residual amount of the cleaning agent preparation located in the cartridge remaining in the cartridge until the end of the dishwashing process, wherein this residual amount corresponds to at least twice the partial amount a; and a partial amount b of cleaning agent preparation B located in the cartridge is dosed into the interior of the dishwasher, a residual amount of the cleaning agent preparation located in the cartridge remaining in the cartridge until the end of the dishwashing process, wherein this residual amount corresponds to at least twice the partial amount b;

a partial amount c of cleaning agent preparation C located in the cartridge is dosed into the interior of the dishwasher, a residual amount of the cleaning agent preparation located in the cartridge remaining in the cartridge until the end of the dishwashing process, wherein this residual amount corresponds to at least twice the partial amount c; and a partial amount d of active ingredient preparation D located in the cartridge is dosed into the interior of the dishwasher, a residual amount of the active ingredient preparation located in the cartridge remaining in the cartridge until the end of the dishwashing process, wherein this residual amount corresponds to at least twice the partial amount d.

13. The cleaning agent product form according to claim 2, wherein cleaning agent preparation C contains the acidifying agent c1) selected from formic acid, acetic acid and/or citric acid.

14. The cleaning agent product form according to claim 3, wherein cleaning agent preparation C the glass corrosion inhibitor c2) is selected from the group consisting of polyethyleneimines, zinc chloride, zinc sulfate, zinc acetate, and mixtures thereof.

15. The cleaning agent product form according to claim 4, wherein cleaning agent preparation C the hydrotropic substance c3) is selected from cumene sulfonate and/or xylene sulfonate.

16. The cleaning agent product form according to claim 6, wherein the complexing agent a2) is selected from the group consisting of L-glutamic acid-N,N-diacetic acid, iminodisuccinic acid, hydroxyimino-disuccinic acid, methylglycinediacetic acid, aspartic acid diacetic acid, hydroxyethane-1,1-diphosphonic acid diethylenetriaminepenta (methylenephosphonic acid) and the salts and mixtures thereof.

17. The cleaning agent product form according to claim 8, wherein the organic solvent of cleaning agent preparation B is selected from the group consisting of glycerol, 1,2-propylene glycol, 1,3-propylene glycol, dipropylene glycol and polyethylene glycols.

18. The cleaning agent product form according to claim 8, wherein the organic solvent of cleaning agent preparation B is 1,2-propylene glycol, the weight proportion of the 1,2-propylene glycol being, based on the total weight of the cleaning agent preparation B 5 to 80 wt. %.

* * * * *